(12) United States Patent
Renfroe et al.

(10) Patent No.: US 12,474,317 B2
(45) Date of Patent: Nov. 18, 2025

(54) MARDAN SUB-SURFACE SENSOR HOUSING FOR REMOTE UNDERWATER VEHICLE DEPLOYMENT AND RECOVERY

(71) Applicant: The United States of America as represented by the Secretary of the Navy, San Diego, CA (US)

(72) Inventors: Daniel Renfroe, Temecula, CA (US); Martin Stacy, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 376 days.

(21) Appl. No.: 18/296,813

(22) Filed: Apr. 6, 2023

(65) Prior Publication Data
US 2024/0336340 A1 Oct. 10, 2024

(51) Int. Cl.
*G01N 33/18* (2006.01)
*B63G 8/00* (2006.01)
*G01C 13/00* (2006.01)

(52) U.S. Cl.
CPC ......... *G01N 33/1886* (2013.01); *B63G 8/001* (2013.01); *G01C 13/00* (2013.01)

(58) Field of Classification Search
CPC .................. G01N 33/1886; B63B 2211/02
See application file for complete search history.

(56) References Cited

U.S. PATENT DOCUMENTS

| | | | | |
|---|---|---|---|---|
| 2,384,739 A | * | 9/1945 | Hasbrook | G01V 7/00 73/382 R |
| 2,750,794 A | * | 6/1956 | Downs | G01N 33/18 73/702 |
| 3,267,419 A | * | 8/1966 | Silverstein | G01C 13/00 343/873 |
| 7,559,236 B1 | * | 7/2009 | Lapota | G01N 21/763 73/170.29 |
| 8,875,645 B1 | * | 11/2014 | Webb | G01C 13/00 441/32 |
| 10,429,184 B2 | * | 10/2019 | Moore | G01N 33/1886 |
| 2011/0214500 A1 | * | 9/2011 | Cabrera | G01C 13/00 73/170.29 |

FOREIGN PATENT DOCUMENTS

| | | | | |
|---|---|---|---|---|
| CN | 116331410 A | * | 6/2023 | ............. B63B 22/00 |
| CN | 118306530 A | * | 7/2024 | ......... G01N 33/1886 |

\* cited by examiner

*Primary Examiner* — Jill E Culler
(74) *Attorney, Agent, or Firm* — Naval Information Warfare Center Pacific; Kyle Eppele

(57) ABSTRACT

A sub-surface sensor housing for remote underwater vehicle deployment and recovery. Moreover, a housing for a sub-surface sensor, comprising a housing body, having a top side, a bottom side, and a sensor cavity in which a sub-surface sensor is placed, wherein the housing body further comprises a plurality of slots through its walls slightly larger than a clamp tie; an attachment hoop coupled to the top side of the housing body, configured to receive a gripping hook from an aquatic vehicle, wherein the attachment hoop has a vertical height that extend above an interference zone; and a plurality of outriggers, coupled to the bottom side of the housing body, configured to disperse the weight of the housing the subsurface sensor.

15 Claims, 3 Drawing Sheets

MARDAN SUB-SURFACE SENSOR HOUSING FOR REMOTE UNDERWATER VEHICLE DEPLOYMENT AND RECOVERY

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case 211,401.

BACKGROUND

Sub-surface aquatic sensors are presently utilized for hydrodynamic data collection in marine environments. Sensors are typically transported by an aquatic vessel and positioned in a deployment location by either being manually placed or floated down to a marine bed. This makes the deployment time for sub-surface sensors time consuming, costly, and/or inaccurate. Moreover, sensor are challenging to retrieve due to environmental conditions and hazards. A lost or damage sensor will not only is a loss for the physical device, but the accompanying data as well. Accordingly, there is need for a sensor deployment and retrieval system or apparatus that enables efficient and accurate placement of sub-surface sensors.

SUMMARY

According to illustrative embodiments, a housing for a sub-surface sensor, comprising a housing body, having a top side, a bottom side, and a sensor cavity in which a sub-surface sensor is placed, wherein the housing body further comprises a plurality of slots through its walls slightly larger than a clamp tie; an attachment hoop coupled to the top side of the housing body, configured to receive a gripping hook from an aquatic vehicle, wherein the attachment hoop has a vertical height that extend above an interference zone; and a plurality of outriggers, coupled to the bottom side of the housing body, configured to disperse the weight of the housing the subsurface sensor.

Additionally, a sub-surface sensor housing for remote operated vehicle (ROV) deployment and recovery, comprising housing body, having a top side, a bottom side, an open forward end, and a rear end, for housing a sub-surface sensor, further comprising a plurality of slots through its walls slightly larger than a clamp tie, a sensor window excised from the forward end of the housing body, a mounting bracket coupled to the top side of the housing body; an attachment hoop coupled to the top side of the housing body, configured to receive a gripping hook from an ROV; a cross bar mounted to the top side of the housing body for providing alignment when interfacing with the ROV's frame to provide alignment and counterforce for accurate gripping; and a plurality of outriggers, coupled to the bottom side of the housing body, configured to disperse the weight of the sub-surface sensor housing.

It is an object to provide a Sub-Surface Sensor Housing for Remote Underwater Vehicle Deployment and Recovery that offers numerous benefits, including efficient mounting, accurate deployment, and rapid recovery.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed system and apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and apparatus described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

As used herein, the terms "sensor," "sensors," "Aquadopp," or any variation thereof, are intended to cover all aquatic or oceanographic sensors. For example, sensors may include AQUADOPP® current meters or current profilers commercially available from Nortek USA of Annapolis, Md.

As used herein, the terms "sea floor," "marine bed," "ocean floor," or any variation thereof, are intended to cover the floor or bed of any body of water.

Figure 1:
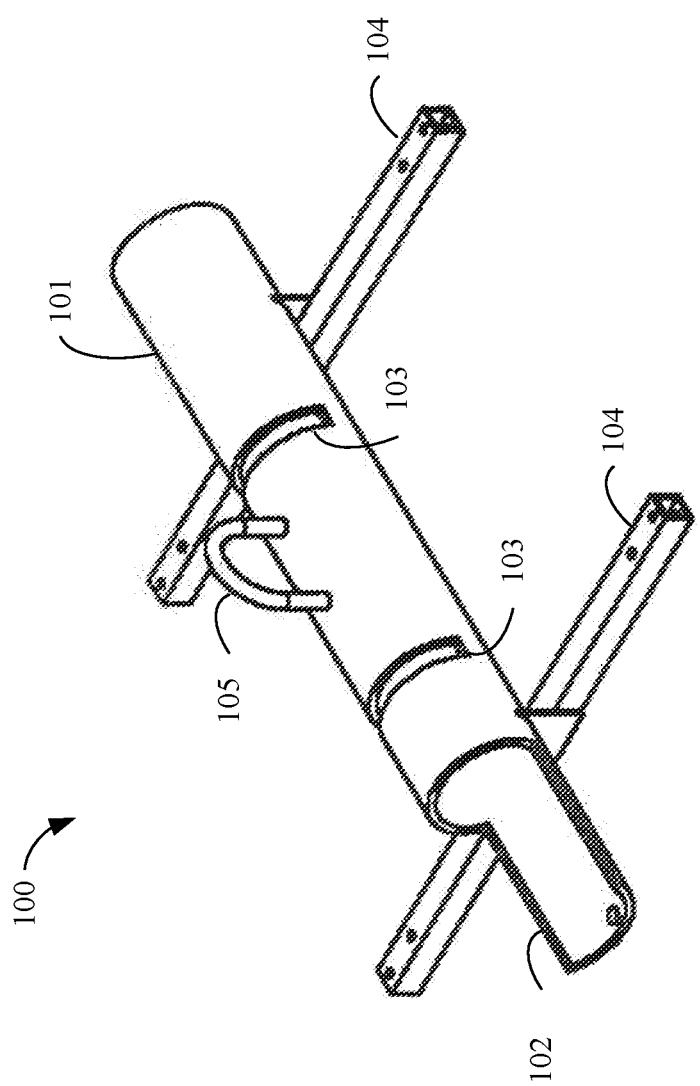
FIG. 1 is an illustration of one embodiment of a sub-surface sensor housing.

FIG. 1 shows an illustration of a sub-surface sensor housing 100 comprising a housing body 101, sensor window 102, plurality of fastener slots 103, plurality of outriggers 104, and a hoop 105. A sub-surface sensor housing 100 may be configured to quickly mount to aquatic vehicles, deploy to the sea floor, and enable the recovery hydrodynamic sensors in a variety of marine environments. The sub-surface sensor housing 100 may be attached to many types of aquatic vehicles including, but not limited to, submarines, remote underwater vehicles (ROVs), or skiffs. The sensor housing apparatus provides protection and a means of speedy deployment and recovery for an encapsulated sensor. This problem is particularly pronounced with cylindrically shaped sensors due to their tendency to roll across the sea floor and drift in currents.

In one embodiment, the sub-surface sensor housing 100 may be quickly mounted to the underside of a ROV, such as a Video Ray® Defender. Mounting may be accomplished by either resting the sensor housing 100 on the ROV's support flats and/or being held into place with power cord. A sensor, such as one in the AQUADOPP® line of oceanographic sensors, may then be loaded into the sensor housing 100. Loading the AQUADOPP® sensor may take around five minutes or less and is significantly faster, safer, and more likely to properly place the sensor with the instant disclosure. Once loaded, an operator may drive the ROV holding the sensor and the sensor housing 100 down to a deployment location. The sensor housing 100 may then be then released to rest on the seafloor, lakebed, riverbed, or the like, while in the proper position for the sensor to record information.

In another embodiment, the housing 100 may be mounted to other aquatic vehicles, including the SRS Fusion R and SeaBotix® ROVs. Furthermore, the sensor housing 100 may house many types of sensors, including Valeport® Oceanographic Instruments and Tools.

The sensor housing 100 enables recovery off of the sea floor via multiple methods. In one embodiment, a line may attach the hoop 105 and a buoy. The sensor housing 100 may then be retrieved by reeling in line from the surface buoy. In some embodiments, a bail may be used to hold this line. In another embodiment, an ROV or aquatic vehicle having a gripper may be driven down to the deployment location and collect the sensor housing 100 by grasping the hoop 105. Proper positioning of the attachment hoop 105 is essential for the ROV to collect the sensor housing 100. The hoop 105 must be sufficiently elevated off of the sea floor.

The housing body 101 may comprise, consist of, or consist essentially of a rigid, a body for hollow housing a sensor having a forward end and rear end along the length of the body; as well as an under side, top side, and internal cavity. The housing body may be substantially cylindrical, but is not so limited. Inside the housing body 101 is the sensor cavity.

The housing body 101 may comprise waterproof material with sufficient strength to support and protect the sensor. As an example, the material may be steel or plastic. Moreover, the housing body 101 has an internal cavity wherein the diameter sufficient to encapsulate a sensor. Additionally, the housing body 101 may have features to accommodate the sensor's data collection equipment including a sensor window 102 and/or a plurality of fastener slots 103. For use with an AQUADOPP® sensor, a housing body 101 may be a hollow cylinder having a diameter between two inches and six inches, and a length between two feet and three feet. The sensor widow 102 is an opening or excised section in the housing 101 for sensor data collection. For example, the forward end of the housing 101 may have half of the cylindrical wall removed for an approximate length of four to twelve inches to accommodate an AQUADOPP® sensor to collect data. In one embodiment, the sensor window 102 is six inches. However, multiple windows 102 of various shapes and sizes could be removed from the housing 101 walls to accommodate alternate sensors.

The plurality of fastener slots 103 are slot openings in the housing body 101 that partially expose the sensor cavity. Each slot 104 may enable a clamp or tie-down mechanism to be utilized to hold the sensor in place. Standard clamps and tie-downs may be used. For example, cable ties or hose clamps may be utilized to fix the sensor by squeezing the sensor against the inside of the housing 101. In one embodiment, the fastener slots are on the top of the housing body 101, as shown in FIG. 1.

The plurality of outriggers 104 are coupled to the underside of the housing body 101 and provide benefits including stabilization, supplemental weight, and elevation off of the marine bed. The plurality of outriggers 104 may consist of a rigid, waterproof material sufficient strength to support the sensor (e.g. steel). In one embodiment, the plurality of outriggers bars 104 are spaced in evenly throughout the length of the housing body 101 to accommodate balance. Their positions relative to the housing body 101 are variable so long as they provide sufficient support, orientation, and balance. Moreover, each of the outriggers extend perpendicularly from the long direction of the housing body 101 to disperse the weight of the sensor housing 100. The sensor housing 100 ideally sits on top of the marine bed with minimal sinking into the sediment so that the sensors remain exposed and may properly collect data. In one embodiment, the plurality of outriggers 104 extend outward from the hold cylinder at least seven inches.

The sinking force provided by the plurality of outriggers 104 may be further supplemented with plurality of weights 109, which may be placed at the ends of the outriggers (furthest from the housing 101) to provide extra stability. When the sensor housing 100 is maneuvered with one to five feet of the sea floor, the weight of the plurality of outriggers 104 and plurality of weights 109 are sufficient to sink the sensor housing 100 in a substantially downward direction, for accurate deployment. In one embodiment, each of the plurality of weights weigh two pounds, which is sufficient weight for accurate deployment. Supplemental weights are an unexpected components of the sensor housing 100 because the weight of the sensor housing 100 and sensor is already substantial, but their addition minimizes the effect of currents and environmental factors that cause inaccurate deployment positions. Precise sensor positioning is crucial to record valid data.

Figure 2:
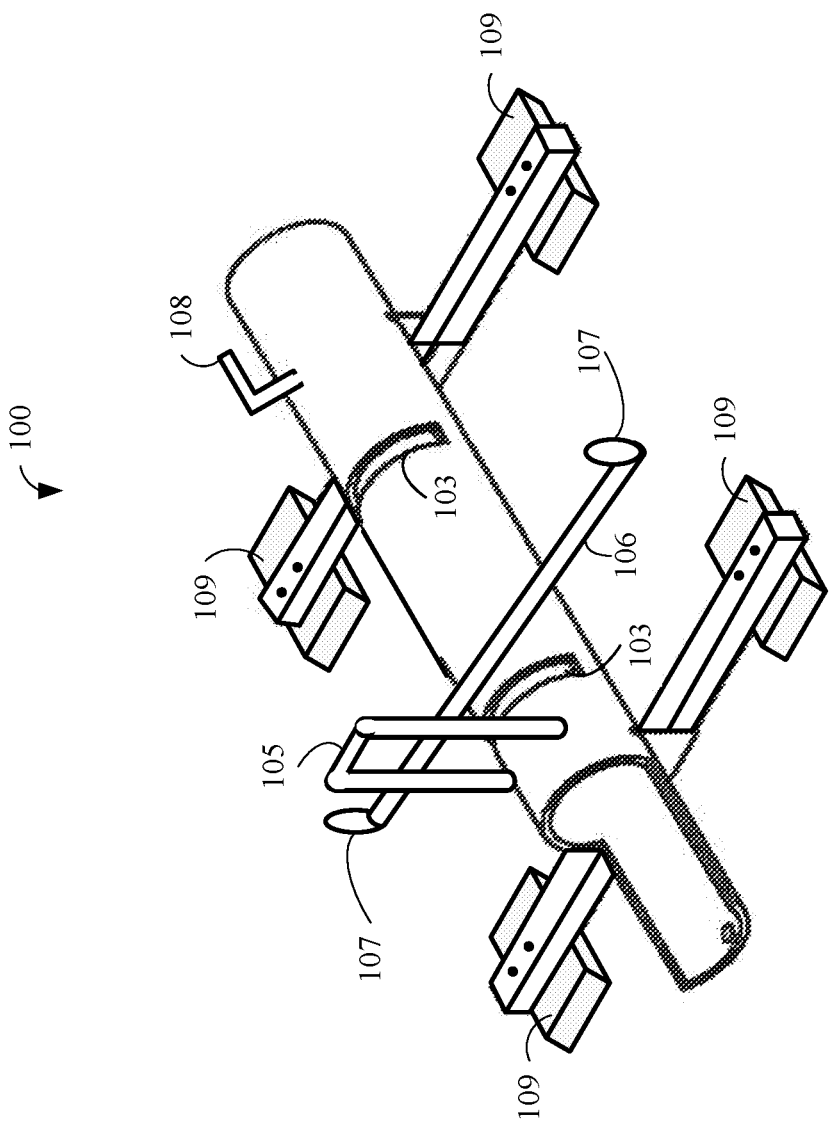
FIG. 2 is an illustration of another embodiment of a sub-surface sensor housing.

The hoop 105 is coupled to the topside of the housing body 101 and provides an attachment point for an aquatic vehicle or retrieval mechanism. The hoop 105 may consist of a rigid, waterproof material sufficient strength to support the sensor (e.g. steel or plastic). The hoop 105 may take a variety of shapes, but, at minimum, is an extruded attachment point elevated off the sensor housing. For two example embodiments, the hoop 105 may be circular (as shown in FIG. 1) or rectangular (as shown in FIG. 2). The hoop 105 serves as an attachment point for an aquatic vehicle, such as a ROV or skiff. For example, the sensor housing 100 may be gripped, coupled, tied, and/or mounted under an ROV via the hoop 105. The ROV may then maneuver the sensor housing 100 to the deployment location and release the hoop 105 to the seafloor. The sensor housing 100 may contain the sensors while they collect data. Once recording is complete, the ROV may return and retrieve the sensor housing 100 by connecting to the hoop 105 and lifting off from the seafloor.

FIG. 2 shows an illustration of another embodiment of a sub-surface sensor housing 100 comprising housing body 101, a hoop 105, crossbar 106, a plurality of tabs 107, and a mounting bracket 108. The hoop 105 shown FIG. 2 is another embodiments of the hoop 105 shown in FIG. 1. In FIG. 2, the hoop 105 has a rectangular shape to facilitate a coupling between the sensor housing 100 and an underwater ROV. Specifically, the rectangular shape may provide a target for a gripping mechanism, wherein the gripping mechanism serves to either release or recover the sensor housing 100. Moreover, the hoop 105 may be constructed to have an extended vertical height, where highest point of the may extend fourteen to seventeen inches off of the ocean floor. A distance of fourteen to seventeen inches off of the sea floor enables significantly more efficient deployment and recovery times. ROVs are commonly equipped with stabilization technology that becomes unreliable near the sea floor. For example, a Digital Velocity Logger (DVL) will may be used to ping the ocean floor to identify its location. Below a height of seven to eight inches, a DVL will lose its lock on the ocean floor. The area in which a DVL lose its lock and operating an ROV becomes challenging may be referred to as the interference zone. An unstable ROV will be more difficult for an operator to maneuver and make accurate deployment or recovery more challenging. When the hoop 105 is elevated fourteen to seventeen inches off of the seafloor, destabilization effects from the ground and minimal and operators are able to accurately and efficiently maneuver the ROV.

The crossbar 106 is a stabilizing member having at least two ends that extend in substantially perpendicular from the long side of the housing body 101. The crossbar 106 may comprise a rigid waterproof material, such as metal, as an example, and is coupled to the sensor housing 100. In one embodiment, the crossbar 106 is welded to the sensor housing 100. Additionally, the crossbar 106 may serve as a bracing member to provide a counterforce for a ROV's frame or the underside of a Universal Skid. The crossbar 106 may further comprises a plurality of tabs 107 coupled to each ends the crossbar 106 and are configured to confine the sensor housing's 100 lateral movement.

The plurality of tabs 107 may comprise a rigid, waterproof material. The tabs extend vertically from the ends of the crossbar 106 to guide the frame of an ROV or aquatic vehicle while attaching to the hoop 105.

The mounting bracket 108 may be coupled to the rear end of the housing body 101 and is configured to quickly attach the sensor housing 100 to an aquatic ROV skiff, or Universal Skid. The mounting bracket 108 may comprise the same material at the housing body 101. For example, the mounting bracket 108 may comprise steel and be welded to the housing body 101. In one embodiment, the mounting bracket is an "L" channel, where the channel accommodates the size of a corresponding crossbar on the ROV to facilitate the attachment. In this embodiment, the "L" channel may have a height of about 3 inches.

Figure 3:
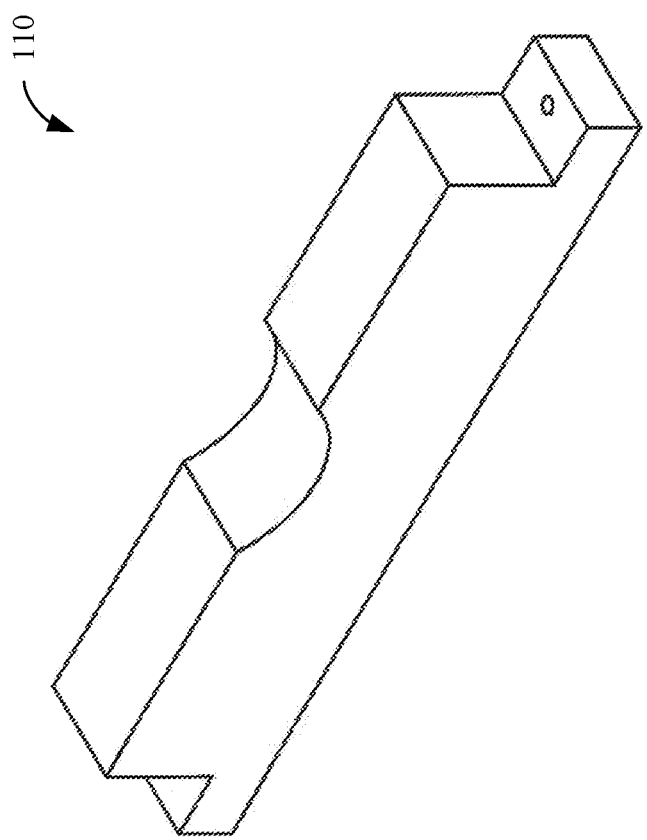
FIG. 3 is an illustration of a float block.

FIG. 3 shows an illustration of float block 110 configured to provide buoyant force to the sensor housing 100. The float block 110 may be coupled to the housing body 101 or one or more of the plurality of outriggers 104. The buoyant force provided by the float block 110 offsets the weight added by the sensor and sensor housing 101 that the aquatic vehicle is transporting.

From the above description of the MarDan Sub-Surface Sensor Housing for Remote Underwater Vehicle Deployment and Recovery, it is manifest that various techniques may be used for implementing the concepts of a housing for a sub-surface sensor and a sub-surface sensor housing for ROV deployment and recovery without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that concepts of a housing for a sub-surface sensor and a sub-surface sensor housing for ROV deployment and recovery are not limited to the particular embodiments described herein, but is capable of many embodiments without departing from the scope of the claims.

What is claimed:

1. A housing for a sub-surface sensor, comprising:
    a housing body, having a top side, a bottom side, and a sensor cavity in which a sub-surface sensor is placed, wherein the housing body further comprises a plurality of slots through its walls dimensioned to permit passage of a flexible tie selected from a cable tie or a hose clamp band to secure the sensor with the sensor cavity;
    a plurality of outriggers, coupled to the bottom side of the housing body, configured to disperse the weight of the housing the subsurface sensor each outrigger extending laterally at least about seven inches from the housing body; and
    an attachment hoop coupled to the top side of the housing body, configured to receive a gripping hook from an aquatic vehicle, wherein the attachment hoop has a vertical height measured from the sea floor to a highest point of the hoop when the housing rests on the plurality of outriggers.

2. The housing for a sub-surface sensor of claim 1, wherein the housing body is a hollow cylinder having a diameter of about two to five inches and length of twenty-five to thirty-five inches.

3. The housing for a sub-surface sensor of claim 1, further comprising:
    a cross bar, having a plurality of ends, mounted to the top side of the housing body for aligning the aquatic vehicle ROV with the attachment hoop and to provide a counterforce when the aquatic vehicle grips the attachment hoop.

4. The housing for a sub-surface sensor of claim 3, further comprising:
    a plurality of tabs, each tab coupled to each of the plurality of the ends of the crossbar, configured to confine the housings lateral movement relative to the aquatic vehicle and to guide the aquatic vehicle during gripping.

5. The housing for a sub-surface sensor of claim 1, wherein the housing body further comprises a forward end that includes an opening exposing the; sensor cavity, and a sensor window at the forward end through the housing body.

6. The housing for a sub-surface sensor of claim 1, wherein the housing body further comprises a rear end, wherein a mounting bracket is coupled to the top side of the housing body at a location about four inches from the rear end of the housing body.

7. The housing for a sub-surface sensor of claim 6, wherein the mounting bracket is an "L"-channel.

8. The housing for a sub-surface sensor of claim 1, further comprising:
    a float block coupled to the housing body, the float block providing a buoyant force to neutralize the weight of the housing.

9. A sub-surface sensor housing for remote operated vehicle (ROV) deployment and recovery, comprising:
 a housing body, having a top side, a bottom side, a forward end, and a rear end, for housing a sub-surface sensor, further comprising:
  a plurality of slots through its walls sized to receive a cable tie or a hose-clamp band to secure the sensor within the sensor cavity,
  a sensor window formed from the forward end of the housing body,
  a mounting bracket coupled to the top side of the housing body;
 an attachment hoop coupled to the top side of the housing body, configured to receive a gripping hook from an ROV and having a vertical height between about fourteen inches and about seventeen inches measured from the sea floor to a highest point of the hoop when the housing rests on a plurality of outriggers;
 a cross bar mounted to the top side of the housing body for providing alignment when interfacing with the ROV's frame and to provide alignment and counter-force for accurate gripping; and
 a plurality of outriggers, coupled to the bottom side of the housing body, configured to disperse the weight of the sub-surface sensor housing, each outrigger extending laterally at least about seven inches from the housing body.

10. The housing for a sub-surface sensor of claim 9, wherein the housing body is a hollow cylinder capable of encapsulating a cylindrical oceanographic current meter or current profiler sensor.

11. The housing for a sub-surface sensor of claim 9, further comprising:
 a plurality of tabs, each coupled to each of the plurality of the ends of the crossbar, configured to confine the housings lateral movement relative to the ROV and to guide the ROV during gripping.

12. The housing for a sub-surface sensor of claim 9, wherein the sensor window spans about six inches along the length of the housing body.

13. The housing for a sub-surface sensor of claim 9, wherein the mounting bracket is about four inches from the rear end of the housing body.

14. The housing for a sub-surface sensor of claim 13, wherein the mounting bracket is an "L"-channel.

15. The housing for a sub-surface sensor of claim 9, further comprising:
 a float block coupled to the housing body, the float block providing a buoyant force to neutralize the weight of the housing.

* * * * *